United States Patent
Biskeborn et al.

(10) Patent No.: US 9,466,334 B1
(45) Date of Patent: Oct. 11, 2016

(54) MONOLITHIC TAPE HEAD AND ACTUATOR FOR HIGH DENSITY RECORDING

(71) Applicant: International Business Machines Corporation, Armonk, NY (US)

(72) Inventors: Robert G. Biskeborn, Hollister, CA (US); David H. F. Harper, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/920,944

(22) Filed: Oct. 23, 2015

(51) Int. Cl.
*G11B 33/12* (2006.01)

(52) U.S. Cl.
CPC ............ *G11B 33/12* (2013.01); *G11B 33/122* (2013.01); *G11B 33/126* (2013.01)

(58) Field of Classification Search
None
See application file for complete search history.

(56) References Cited

U.S. PATENT DOCUMENTS

| | | | |
|---|---|---|---|
| 5,331,493 A | 7/1994 | Schwarz | |
| 5,748,410 A * | 5/1998 | Briggs | G11B 5/11 360/261.1 |
| 6,078,483 A * | 6/2000 | Anderson | G11B 5/4953 360/260 |
| 6,404,598 B1 * | 6/2002 | Nayak | G11B 5/584 360/256.1 |
| 6,594,118 B1 * | 7/2003 | Nayak | G11B 5/588 360/261.1 |
| 6,690,542 B1 | 2/2004 | Wang | |
| 6,704,169 B2 * | 3/2004 | Nawa | G11B 5/584 360/261.3 |
| 6,773,281 B2 * | 8/2004 | Fletcher | H05K 1/028 360/98.01 |
| 6,972,931 B2 | 12/2005 | Rudi et al. | |
| 7,227,724 B2 * | 6/2007 | Nayak | G11B 5/5504 360/261.1 |

(Continued)

FOREIGN PATENT DOCUMENTS

| | | |
|---|---|---|
| DE | 19847425 A1 | 8/1999 |
| WO | 9613833 A1 | 5/1996 |
| WO | 9617342 A1 | 6/1996 |

OTHER PUBLICATIONS

Pending U.S. Appl. No. 14/920,931, titled "Magnetic Tap Appliance With Selectably Always-Leading Head Assemblies," filed Oct. 23, 2015, pp. 1-30.

(Continued)

*Primary Examiner* — Carlos E Garcia
(74) *Attorney, Agent, or Firm* — Jennifer M. Anda; Samuel A. Waldbaum

(57) ABSTRACT

A monolithic tape head module for high density recording. The module includes an actuator rail, and a tape head transducer array coupled to the actuator rail that includes a plurality of tape head transducer elements. A flex circuit is electrically coupled to the tape head transducer array, and includes first electrical conductors in a first flex circuit path that are coupled to a portion of the tape head transducer elements, and second electrical conductors in a second flex circuit path that are coupled to the remainder of the tape head transducer elements. An actuator shaft is connected to the actuator rail and coupled to a motor that is operated to move the actuator shaft. A plurality of flexures are mechanically coupled to the actuator rail and operated to restrict movement of the actuator rail to a direction aligned with the longitudinal axis of the actuator rail.

20 Claims, 8 Drawing Sheets

(56) References Cited

U.S. PATENT DOCUMENTS

| | | | |
|---|---|---|---|
| 7,342,738 B1 | 3/2008 | Anderson et al. | |
| 7,379,259 B2* | 5/2008 | Nayak | G11B 5/00821 360/261.1 |
| 8,009,377 B2 | 8/2011 | Neumann | |
| 8,054,579 B2 | 11/2011 | Biskeborn | |
| 8,059,355 B2* | 11/2011 | Nayak | G11B 5/584 360/75 |
| 2002/0186496 A1 | 12/2002 | Saliba et al. | |
| 2004/0085682 A1 | 5/2004 | Jang et al. | |
| 2004/0233581 A1* | 11/2004 | Poorman | H05K 1/028 360/241 |
| 2006/0098350 A1* | 5/2006 | Hamidi | G11B 5/3906 360/323 |
| 2006/0181812 A1 | 8/2006 | Kwon et al. | |
| 2007/0076324 A1* | 4/2007 | Moore | G11B 5/00826 360/261.1 |
| 2008/0273278 A1* | 11/2008 | Iben | G11B 5/40 360/323 |
| 2009/0141389 A1 | 6/2009 | Saliba | |
| 2013/0112009 A1* | 5/2013 | Mokady | G01F 1/8409 73/861.354 |
| 2013/0258519 A1 | 10/2013 | Poorman et al. | |
| 2014/0029135 A1 | 1/2014 | Koeppe | |
| 2014/0327983 A1 | 11/2014 | Biskeborn et al. | |
| 2014/0347766 A1 | 11/2014 | Biskeborn et al. | |
| 2015/0199981 A1* | 7/2015 | Torline | G11B 5/00826 360/90 |

OTHER PUBLICATIONS

Pending U.S. Appl. No. 14/920,936, titled "Dual-Path Flex Circuit," filed Oct. 23, 2015, pp. 1-25.

Zhong et al., "H2 Model Matching Feedforward Control for Tape Head Positioning Servo Systems", 2013 American Control Conference (ACC), Washington, DC, USA, Jun. 17-19, 2013, pp. 4504-4509, © 2013 AACC.

Soda, "Modeling Electrostatic Discharge Affecting GMR Heads," IEEE Transactions on Industry Applications, vol. 43, No. 5, Sep./Oct. 2007, Copyright 2007 IEEE, pp. 1144-1148.

* cited by examiner

MONOLITHIC TAPE HEAD AND ACTUATOR FOR HIGH DENSITY RECORDING

BACKGROUND

The present invention relates generally to the field of dynamic magnetic information storage and retrieval, and more particularly to a monolithic multichannel tape head and actuator for high density magnetic recording.

A typical approach for enabling higher data rates in magnetic tape technology is by adding active channels to the tape heads. However, this approach is becoming increasingly difficult to implement as heads, flex circuits, and electronics become more and more congested due to a need for packaging more I/O into the limited space of the head and head assembly. Typical solutions have included implementing head modules having a reduced footprint, along with associated cabling, connections, connectors, and ASICs. Disadvantages of this approach may include increased complexity and component cost, and lower yields and reliability. The problem is compounded in conventional multi-module tape heads. Typically, conventional tape heads are comprised of two or more modules configured to perform bi-directional read verify after writing.

The need for redundant magnetic transducers for enabling read-verification during writing may result in difficulties meeting packaging, electronic, and thermal requirements. For example, a tape drive with 16 active channels, such as a typical tape drive operating in accordance with Linear Tape-Open sixth generation (LTO-6), may contain 16 writer and 16 reader transducers in each of two head modules for bidirectional read-while-write operation, thus containing 64 channels and illustrating 2× redundancy. Achieving higher data rates, for example, by increasing the number of active channels to 64 while maintaining 2× redundancy, results in increasing the number of writer and reader transducers to 64 on each of two heads, resulting in 256 channels. Such a head assembly requires 256 pairs of 110 bonding pads. Given the space constraints in the current form factor products, this may present challenges in routing of wire bond leads, increased on-chip lead length and resistances, heat generation, and production yield. In some tape heads, read verify is performed by a separate, independently track-following head, but even so, the heads typically contain two or more modules to enable bi-directional operation. Known solutions to these problems have been incremental, and have included reducing module size, but this is increasingly difficult to do, as modules become more fragile and difficult to manufacture.

Space available for cabling is also limited. Bulky cables may impact actuator performance due to mechanical bias, stress, and coupling effects. In addition, cable trace geometry may be pushed to current design and manufacturing limits. Another issue is limitations of the actuator to accurately perform track-following operations as channel density increases due not only to stiff, bulky cables, but also to the size of the head moving mass. Multi-module heads only compound this problem. Yet another issue with conventional multi-module tape head-actuator assemblies is that their size does not enable close spacing of the assemblies, as these may be bulky due to the need to contain two or more modules and all the associated cabling.

BRIEF SUMMARY

Embodiments of the invention present a single rail tape head module for high density recording. The module includes an actuator rail, and a tape head transducer array coupled to the actuator rail that includes a plurality of tape head transducer elements. A flex circuit is electrically coupled to the tape head transducer array, the flex circuit including a first plurality of electrical conductors in a first flex circuit path that are coupled to a portion of the plurality of tape head transducer elements, and a second plurality of electrical conductors in a second flex circuit path that are coupled to the remainder of the plurality of tape head transducer elements. An actuator shaft is connected to the actuator rail and coupled to a motor that is operated to move the actuator shaft. A plurality of flexures are mechanically coupled to the actuator rail and operated to restrict movement of the actuator rail to a direction aligned with the longitudinal axis of the actuator rail.

Other embodiments of the invention present a tape appliance that includes a plurality of tape head actuators, in which at least one of the actuators includes an actuator rail, and a tape head transducer array coupled to the actuator rail and including a plurality of tape head transducer elements. A flex circuit is electrically coupled to the tape head transducer array, the flex circuit including a first plurality of electrical conductors in a first flex circuit path that are coupled to a portion of the plurality of tape head transducer elements, and a second plurality of electrical conductors in a second flex circuit path that are coupled to the remainder of the plurality of tape head transducer elements. An actuator shaft is connected to the actuator rail and coupled to a motor that is operated to move the actuator shaft. A plurality of flexures are mechanically coupled to the actuator rail and operated to restrict movement of the actuator rail to a direction aligned with the longitudinal axis of the actuator rail.

DETAILED DESCRIPTION

Figure 1:
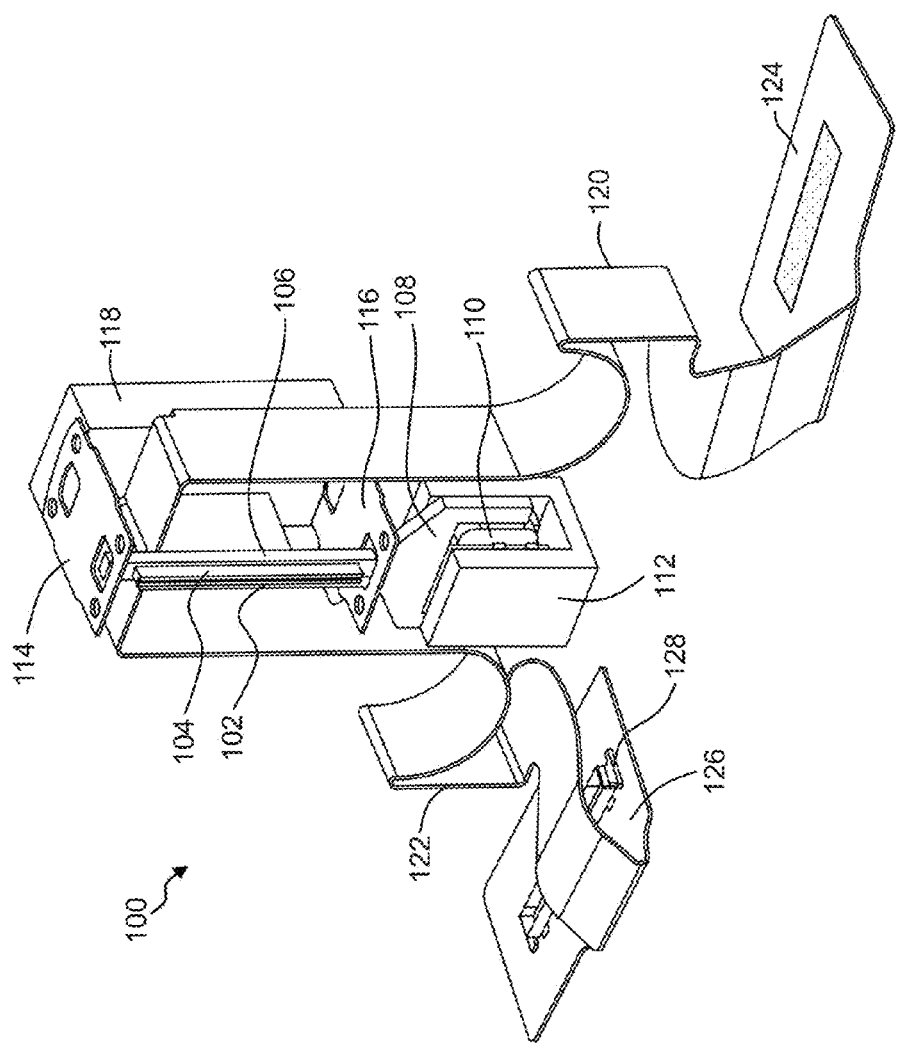
FIG. 1 is a perspective view of a monolithic tape head module, in accordance with an embodiment of the present invention.

Embodiments of the invention are general directed to a low mass, compact, monolithic magnetic tape head and actuator for high-density recording. The monolithic tape head is an integrated head, for example, configured with a single rail, and directed to a single purpose, such as either reading or writing. In an exemplary embodiment, the tape head includes only a single module, i.e., only read transducers or only write transducers with servo reading transducers. Having only a single module enables a low mass, high bandwidth implementation. For example, unlike traditional tape head configurations having redundant magnetic transducers for enabling read-verification during writing, all transducers may be configured for a single purpose—either reading or writing. In one embodiment, this results in reducing the channels exiting the module by half, as compared to a traditional module configured as write-read, or by two thirds as compared to a traditional module configured a write-read-write.

In addition, efficiencies may be gained in the cabling configuration of the single purpose module. For example, with only single purpose transducers, the need for two or three wire bond sites, for example, one for the read channels cable and another one or two for the write channels cables, may be eliminated. Instead, only a single wire bond site may be needed for the single purpose transducer channels.

In an exemplary embodiment, the read or write element channels from the single rail module attach to a flex circuit at a single wire bond site on the tape head, and exit the module via two paths in the flex circuit, each path presenting channel connections to the circuit board, with approximately half of the channels connected to the board via one path, and the approximately other half the channels connected via the other path. The flex circuit is configured as a unitary circuit that includes two connectors, one each at opposing ends of the flex circuit for connection to the circuit board, and a head module channels connection tab located on the flex circuit intermediate the opposing ends of the flex circuit. One implementation of such a flex circuit is disclosed in U.S. patent application Ser. No. 14/920,936 to Biskeborn, et al., titled "Dual-Path Flex Circuit," the entirety of which is hereby incorporated by reference.

Such a dual-path flex circuit may act to reduce the mechanical interactions between the cables and the actuator during actuator motion. The dual-path flex circuit may also allow for a more compact head module through narrower width cables. The more compact design may further lead to a reduction in the required flexure lengths, thus enabling the head-actuator assembly to fit into a smaller space. Further, the dual-path design may enable relieving constraints on trace geometry within the flex circuit paths, for example, by allowing more space between trace pairs for transducers, compared to a conventional cable. This may enable reducing crosstalk between trace pairs. Crosstalk is a known problem in cable designs, particular for write transducer cables, in which crosstalk between trace pairs may lead to reduced signal-to-noise ratio for data written to the medium and thus reduced operating margin and ultimately reduced achievable areal density.

Other advantages of single purpose head configurations, such as disclosed herein, may include that such a single purpose configuration may result in enabling of a doubling of the track density by shifting and repurposing one of the sets of transducers, in a previously piggyback arrangement, into an interleaved configuration with respect to the other set of transducers.

Another aspect of the monolithic multichannel tape head described herein is the use of a voice coil track-following linear motor assembly coupled to the actuator shaft that enables additional reduction in the head-actuator foot print. In an exemplary embodiment, the motor is configured as a pancake motor in a vertical configuration, which may reduce the lateral footprint of the head-actuator assembly, at least in the motor axial direction. In a preferred embodiment, the axis of the pancake motor is oriented parallel to the tape head surface so as to reduce the effects of the magnetic field of the motor windings on the tape head elements and the tape magnetic media.

In certain embodiments, rather than having the tape head attached to the rail portion of the actuator shaft, the rail portion of the actuator shaft is the tape head, which is then attached to the lower part of the actuator shaft that is coupled to the motor. Advantages of this configuration may include that the axis of movement of the tape head is closer to, or even in, the plane of the driving force of the motor, which may reduce certain actuator flexure modes that can disturb track-following performance.

FIG. 1 is a perspective view of a monolithic tape head module 100, in accordance with an embodiment of the present invention. monolithic tape head module 100 includes read or write element array 102, head support substrate 104, actuator rail 106, actuator shaft 108, actuator motor 110, motor housing 112, upper and lower flexures 114 and 116, flexure support structure 118, first flex circuit path 120 with first circuit board connector portion 124, second flex circuit path 122 with second circuit board connector portion 126, and cable connector 128.

In an exemplary embodiment, monolithic tape head module 100 is a single tape head module in which the element array 102 is directed to either reading or writing onto a magnetic tape medium. In various embodiments, as described in more detail with respect to FIG. 3, element array 102 will include only read or only write transducers, and one or more servo transducers for track following. In particular, monolithic tape head module 100 does not include an integrated read after write verification capability. Such a verification capability could be implemented, for example, through the use of another tape head module, such as a single rail tape head module in accordance with the present invention with only read capability.

In one embodiment as illustrated, element array 102 is fabricated on a head support substrate 104, which is attached to actuator rail 106. In another embodiment, head support substrate 104 acts as the actuator rail 106. These embodiments are described in more detail with respect to FIGS. 4A and 4B. Actuator rail 106 is mechanically coupled to upper and lower flexures 114 and 116, which act to keep actuator rail 106, and the face of element array 102, in alignment with a tape passing laterally across the element array by restricting the movement of the actuator rail to a direction aligned with the longitudinal axis of the actuator rail. In one embodiment, upper and lower flexures 114 and 116 are a pair of simple cantilever springs that form a parallelogram with actuator rail 106 and flexure support structure 118. In certain embodiments, upper and lower flexures 114 and 116 may allow for a rotational head motion, for example, to adjust for tape skew, in addition to translational motion normal to the transverse direction of travel of a tape across element array 102.

Figure 8:
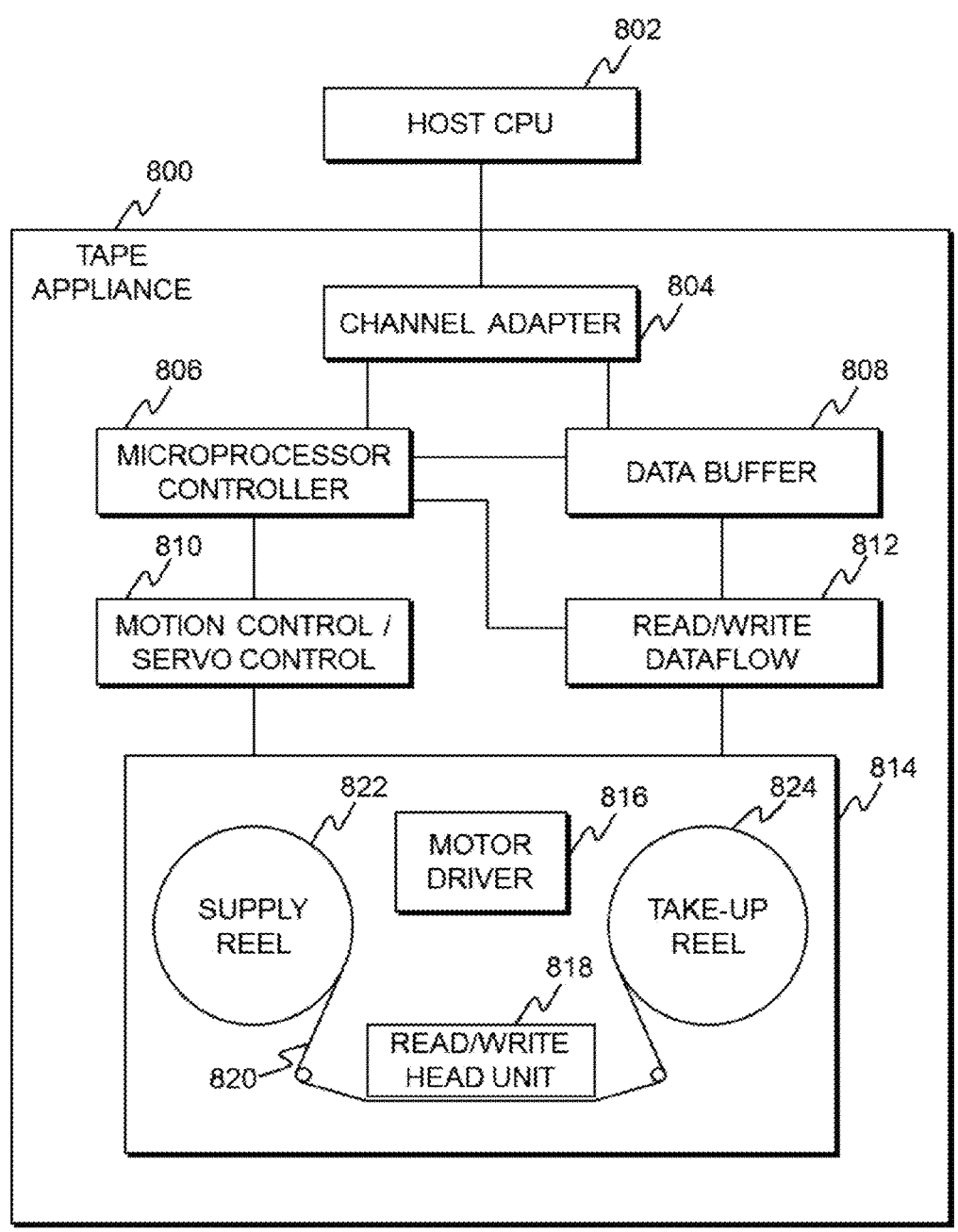
FIG. 8 is a functional block diagram illustrating a tape recording appliance, in accordance with an embodiment of the present invention.

Actuator rail 106 is attached to, or is integral with, actuator shaft 108, which is coupled to motor 110. In operation, motor 110 moves actuator shaft 108 and actuator rail 106, under the constraints of upper and lower flexures 114 and 116, along an axis aligned with element array 102, under the control of a motion control system 810 (FIG. 8). In an exemplary embodiment, motor 110 is a precision stepper voice coil linear pancake motor in a vertical configuration. Preferably, motor 110 and actuator shaft 108 are configured such that the coupling of the driving force of motor 110, for example, where the shaft of motor 110 couples to actuator shaft 108, is axially aligned, within design constraints, with the moving mass of the actuator shaft 108, actuator rail 106, head support substrate 104, and element array 102 assembly, whereby such an alignment may help to reduce or eliminate certain flexure modes in the assembly that can disturb track-following performance.

In one embodiment, motor 110 is oriented such that the plane of the pancake motor is parallel to the plane of the face of element array 102. Those of skill in the art will recognize that in practice, motor 110 is oriented such that the plane of the pancake motor is parallel to the plane of the face of element array 102 within a design threshold value. This configuration may result in a head assembly with a footprint having a reduced depth. In another embodiment, as described in more detail with respect to FIG. 2, motor 110 is oriented such that the plane of the pancake motor is orthogonal to the plane of the face of element array 102. Those of skill in the art will recognize that in practice, motor 110 is oriented such that the plane of the pancake motor is orthogonal to the plane of the face of element array 102 within a design threshold value. This configuration may act to reduce the effects of the magnetic field of the motor windings, which are perpendicular to the plane of motor 110, on the tape head elements and the tape magnetic media.

In an exemplary embodiment, monolithic tape head module 100 includes a flex circuit that connects the element array 102 to a circuit board. As described in more detail below with respect to FIGS. 5 and 6, the flex circuit connects to element array 102 at a single wire bond site, and exits the head module in two flex circuit paths 120 and 122, each path presenting channel connections to the circuit board, with approximately half of the channels connected to the board via one path, and the approximately other half the channels connected via the other path. In one embodiment, one flex circuit path exits the monolithic tape head module 100 to one side, and the other path exits the monolithic tape head module 100 to the other side. The flex circuit is configured as a unitary circuit that includes two connectors, one each at opposing ends 124 and 126 of the flex circuit for connection to the circuit board, and a head module channels connection tab 500 (not shown, see FIG. 5) located on the flex circuit intermediate the opposing ends of the flex circuit. In one embodiment, flex circuit paths 120 and 122 couple to element array 102 via a head module channels connection tab 500 (not shown), and connect the channels of the element array to a circuit board by, for example, connectors, such as connector 128, in the circuit board connector portions 124 and 126. Circuit board connector 128 represents an example connector for connecting the channel traces, or conductors, of the flex circuit to a circuit board.

As illustrated, flex circuit paths 120 and 122 include various bends and rolling loops designed, among other considerations, to manage the mechanical bias imparted by these flex circuit paths on actuator rail 106 as actuator rail 106 and actuator shaft 108 move during normal operation.

Figure 2:
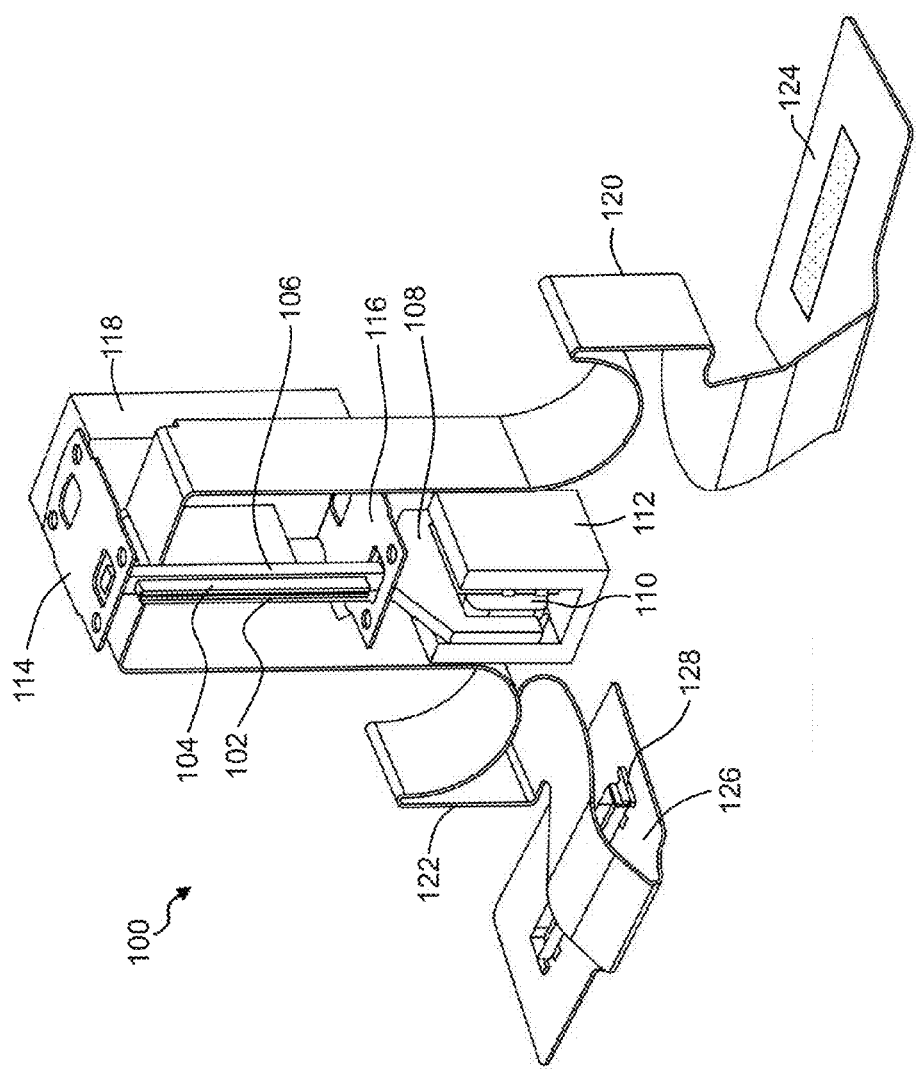
FIG. 2 is a perspective view of another monolithic tape head module, in accordance with an embodiment of the present invention.

FIG. 2 is a perspective view of another monolithic tape head module, in accordance with an embodiment of the present invention. The embodiment of monolithic tape head module 100 illustrated in FIG. 2 may be considered conceptually the same as the embodiment illustrated in FIG. 1, with the exception that motor 110, along with motor housing 112 and actuator shaft 108, are rotated 90 degrees. In this configuration, motor 110 is oriented such that the plane of the pancake motor is orthogonal to the plane of the face of element array 102, within a design threshold value. This configuration may act to reduce the effects of the magnetic field of the motor windings, which are perpendicular to the plane of motor 110, on the tape head elements and the tape magnetic media.

Figure 3:
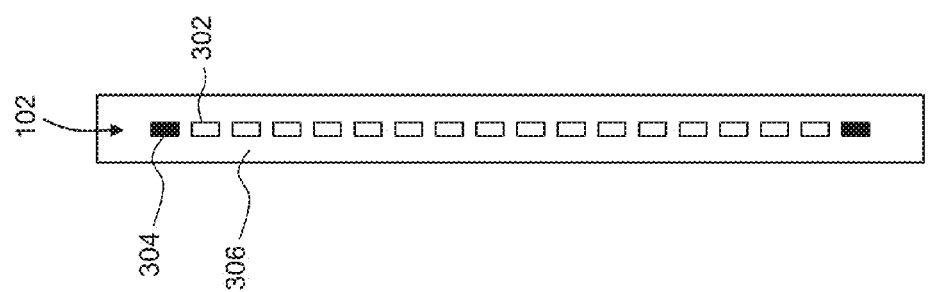
FIG. 3 illustrates a read or write element array, in accordance with an embodiment of the present invention.

FIG. 3 illustrates a read or write element array 102, in accordance with an embodiment of the present invention. As shown, the read or write element array may include, for example, 16 read or write elements 302, and two servo readers 304, though the number of elements may vary. Illustrative embodiments may include, but are not limited to, 16, 32, or 64 active read or write elements per array. In exemplary embodiments of the invention, read or write element array 102 is disposed in a tape bearing surface, represented by surface 306. Read or write element array 102 may include one or more servo readers 304 for reading servo tracks on a magnetic tape.

Although element array 102 is shown in a linear configuration, other embodiments may implement other configurations. For example, the array may be configured as two or more rows of transducer elements arranged in an interleaved manner.

Figure 4B:
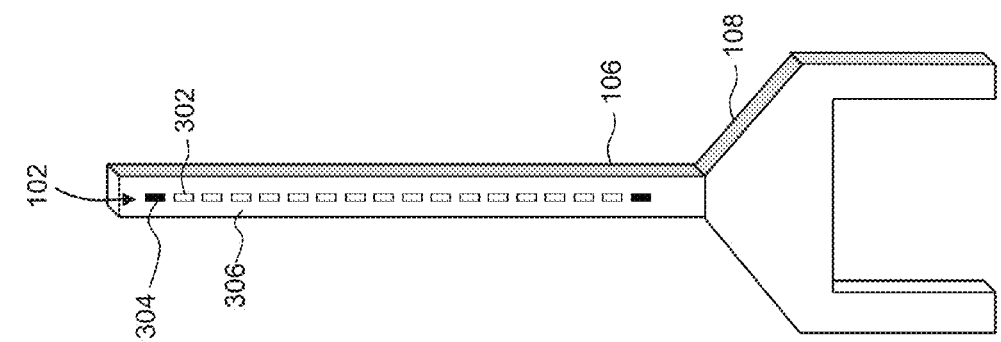
FIGS. 4A and 4B are perspective views of actuator rail assemblies, in accordance with embodiments of the present invention.
Figure 4A:
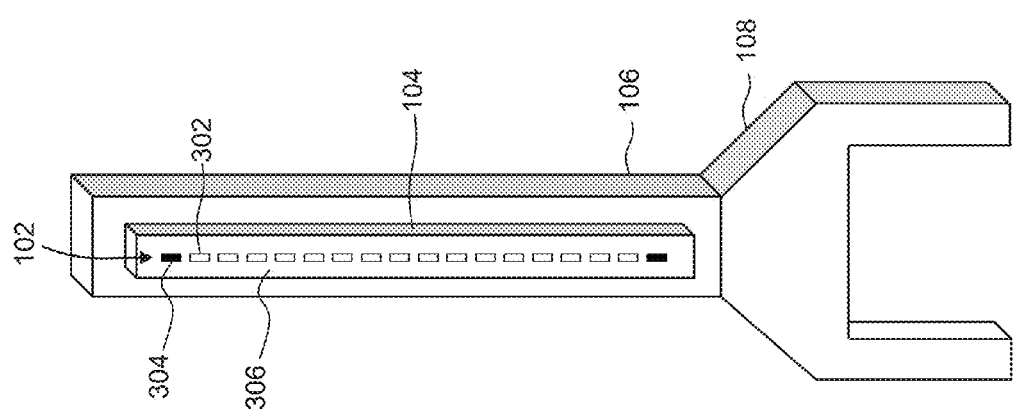

FIGS. 4A and 4B are perspective views of actuator rail and shaft assemblies, in accordance with embodiments of the present invention. In the embodiment illustrated in FIG. 4A, element array 102 is fabricated on a head support substrate 104, which is attached to actuator rail 106. The wire bond pads by which the transducers of element array 102 couple to the channel traces of flex circuit paths 120 and 122, are localized at a wire bond site (not shown), such as a single or double row of wire bond pads on the back side of head support substrate 104 accessible through the back of actuator rail 106. As mentioned above, and described in more detail with respect to FIG. 5, a head module channels connection tab 500 located between flex circuit paths 120 and 122 connects to the wire bond site.

FIG. 4B illustrates an alternative embodiment of the actuator rail and shaft assembly. In this embodiment, actuator rail 106 is the tape head, which is then attached to actuator shaft 108 that is coupled to the motor. For example, head support substrate 104 is engineered and fabricated to provide sufficient mechanical support to element array 102 so as to act as the tape head rail of monolithic tape head module 100. Advantages of this configuration may include that the axis of movement of the tape head is closer to, or even in, the plane of the driving force of the motor, which may reduce certain actuator flexure modes that can disturb track-following performance. Further, this configuration may enable a reduction in the moving mass of the actuator rail 106 and actuator shaft 108 structure.

Figure 5:
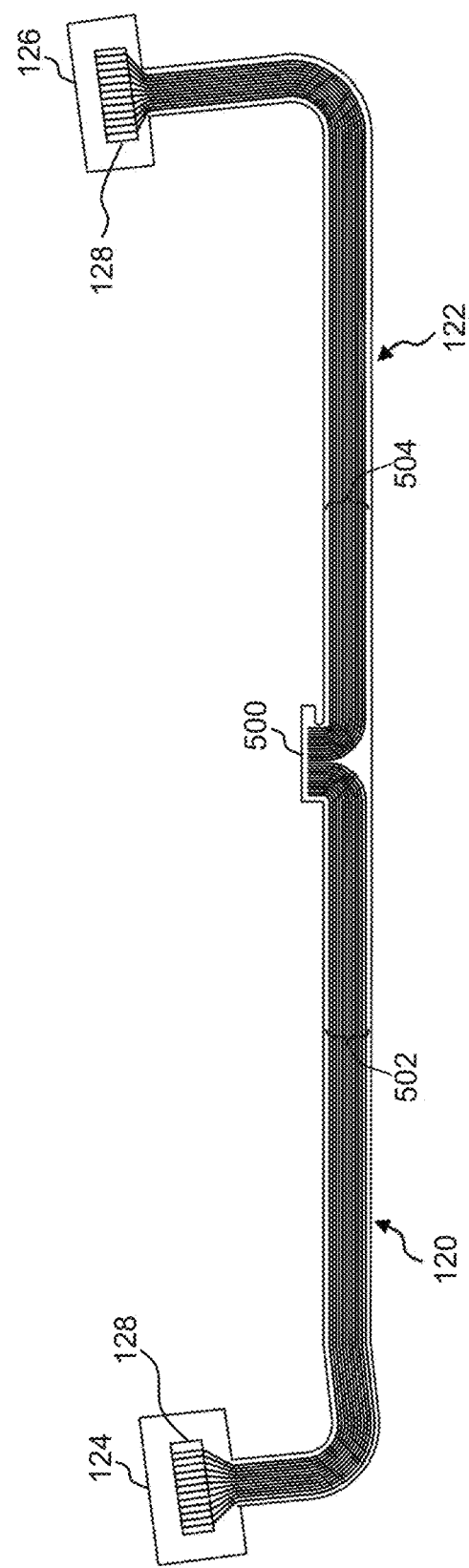
FIG. 5 is a plan view of a flex circuit, in accordance with an embodiment of the present invention.

FIG. 5 is a plan view of a flex circuit, in accordance with an embodiment of the present invention. The flex circuit includes flex circuit paths 120 and 122, which include channel connector traces, or conductors, 502 and 504, respectively, head module channels connection tab 500, and first and second circuit board connector portions 124 and 126, each of which may include a cable connector 128.

First flex circuit path 120 includes channel connector traces 502 that electrically couple head module channels connection tab 500 and the circuit board connector 128 coupled to circuit board connector portion 124. Similarly, second flex circuit path 122 includes channel connector traces 504 that electrically couple head module channels connection tab 500 and the circuit board connector 128 coupled to circuit board connector portion 126. In an exemplary embodiment, head module channels connection tab 500 is configured to allow wire bonding of channel connection traces that terminate on head module channels connection tab 500 to the channel traces coupled to element array 102.

In an exemplary embodiment, head module channels connection tab 500 and channel connector traces 502 and 504 are configured such that each of channel connector traces 502 and 504 represent approximately half of the total number of channel connector traces of the flex circuit. For example, in certain element array 102 configurations, there may be an odd number of elements, such as 17, 33, 65, etc., or there may be additional connections to the element array 102 resulting in an off number of channel traces. In these situations, the number of traces in channel connector traces 502 and 504 may not be equal. In addition, the number of traces in each flex circuit path 120 and 122 may be unequal in order to provide a balanced overall bias force at channels connection tab 500, when bias forces not caused by the flex cable are taken into account. In certain embodiments, first flex circuit path 120 and second flex circuit path 122 may be constructed such that one or more characteristics of the two flex circuit paths are approximately symmetrical. For example, it may be desirable for the physical lengths of first flex circuit path 120 and second flex circuit path 122 to be approximately equal so that signal times along both paths are approximately equal. First flex circuit path 120 and second flex circuit path 122 may also be constructed such that certain mechanical characteristics of the two circuit paths are symmetric, as presented at head module channels connection tab 500. For example, the flex circuit may be constructed such that first flex circuit path 120 and second flex circuit path 122 present approximately equal mechanical stresses at head module channels connection tab 500 and actuator rail 106 when the flex circuit is in use in with monolithic tape head module 100. In an exemplary embodiment, each of first and second flex circuit paths 108/110 is approximately 4 mm wide.

In an exemplary embodiment, the flex circuit includes a flexible dielectric layer with a ground plane (not shown) disposed on or adjacent one face of the flexible dielectric, and channel connector traces 502 and 504 disposed on or adjacent the opposing face of the flexible dielectric. In one embodiment, the dielectric layer is liquid crystal polymer (LCP), and the ground plane and channel connector traces 502 and 504 are formed of copper. Those of skill in the art will recognize that in other embodiments, other combinations of materials may be used for the dielectric layer and the ground plane and channel connector traces, based on design requirements, which may include desired electrical and mechanical properties of the materials. It will also be recognized that the flex circuit may include layers in addition to the dielectric, ground plane, and channel connector trace layers, that may serve electrical, mechanical, or structural design requirements.

Figure 6:
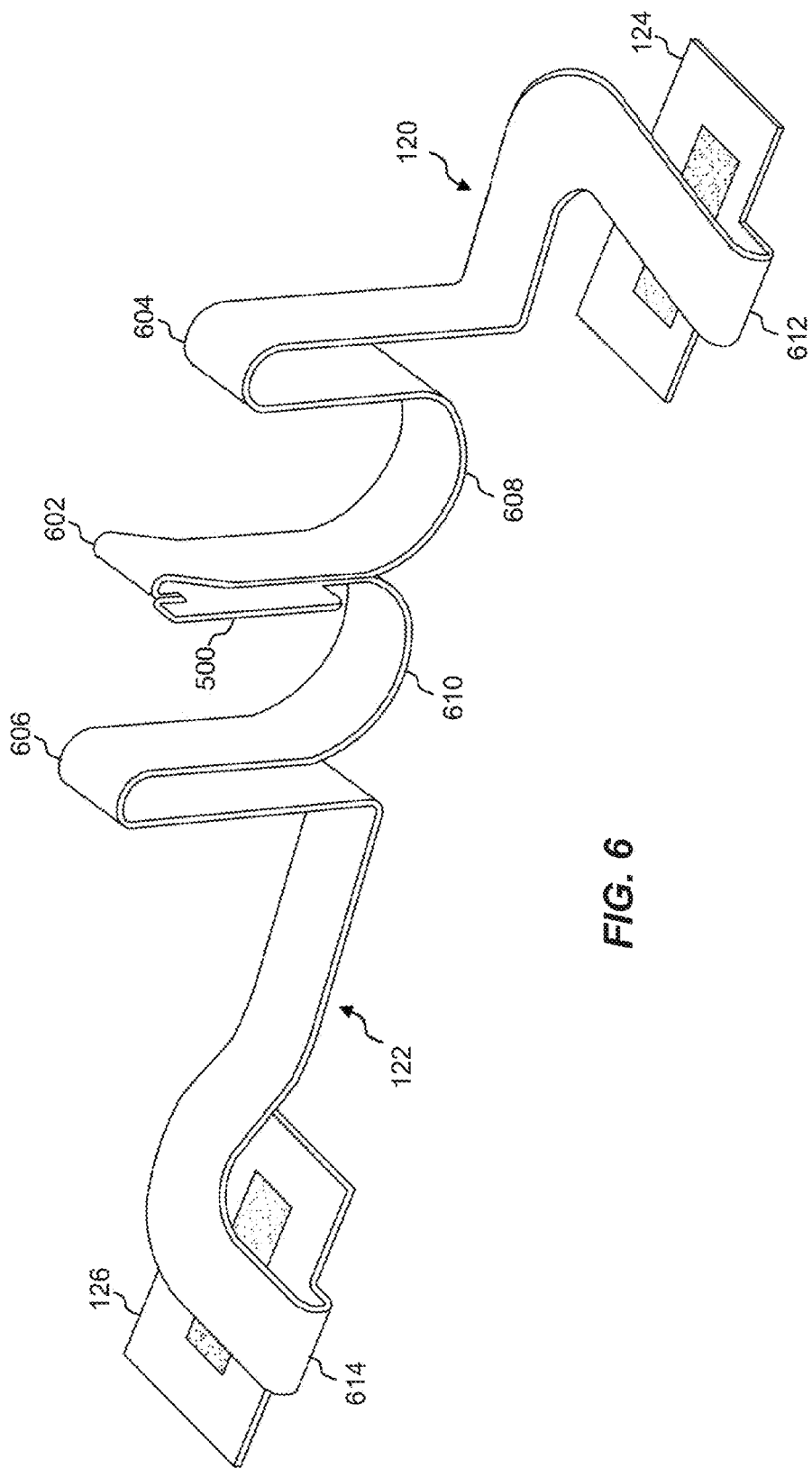
FIG. 6 is a perspective view of a folded flex circuit, in accordance with an embodiment of the present invention.

FIG. 6 is a perspective view of a folded flex circuit, in accordance with an embodiment of the present invention. As illustrated, in an exemplary embodiment, when folded, the flex circuit includes first, second, and third uprights 602, 604, and 606. First rolling loop 608 is formed between, and results from, first and second uprights 602 and 604, and second rolling loop 610 is formed between, and results from, first and third uprights 602 and 606.

In the illustrated embodiment of FIG. 6, the folded flex circuit further includes bends 612 and 614, occurring at the distal ends of flex circuit paths 120 and 122 close to first and second circuit board connectors 124 and 126. In the illustrated embodiment, first and second circuit board connectors 124 and 126 are on portions of first and second flex circuit paths 120 and 122 that extend generally laterally to the portions of first and second flex circuit paths 120 and 122 that attach to head module channels connection tab 500.

In general, the particular topology of the folded flex circuit in various embodiments will be based upon various design factors including tape head module design, cable routing, circuit board layout, stress, strain, torque, and other mechanical forces presented at a tape head module attached to head module channels connection tab 500 as the tape head module moves during normal operation, electrical characteristics of the tape head and flex cable, EMI, channel crosstalk, cost, aesthetics, etc.

As illustrated, the various loops and bends in the folded flex circuit have associated radii of curvature. In certain embodiments, it may be desirable to configure the loops and bends such that those having radii of curvature less than a certain minimum value have their inner radii on the face of the flex circuit that includes the ground plane layer. This may act to lessen the impact of the stress and strain to the ground plane layer and the channel connector traces 502/504 resulting from the bends because the channel connector trace layer will experience a compressive stress and the ground plane layer will experience a tensile stress. For example, the impact of small failures in the ground plane layer resulting from the tensile stress of sharp bends in the flex circuit will likely be less than the impact of small failures in the channel connector traces 502/504 resulting from the tensile stress of the sharp bends.

Figure 7:
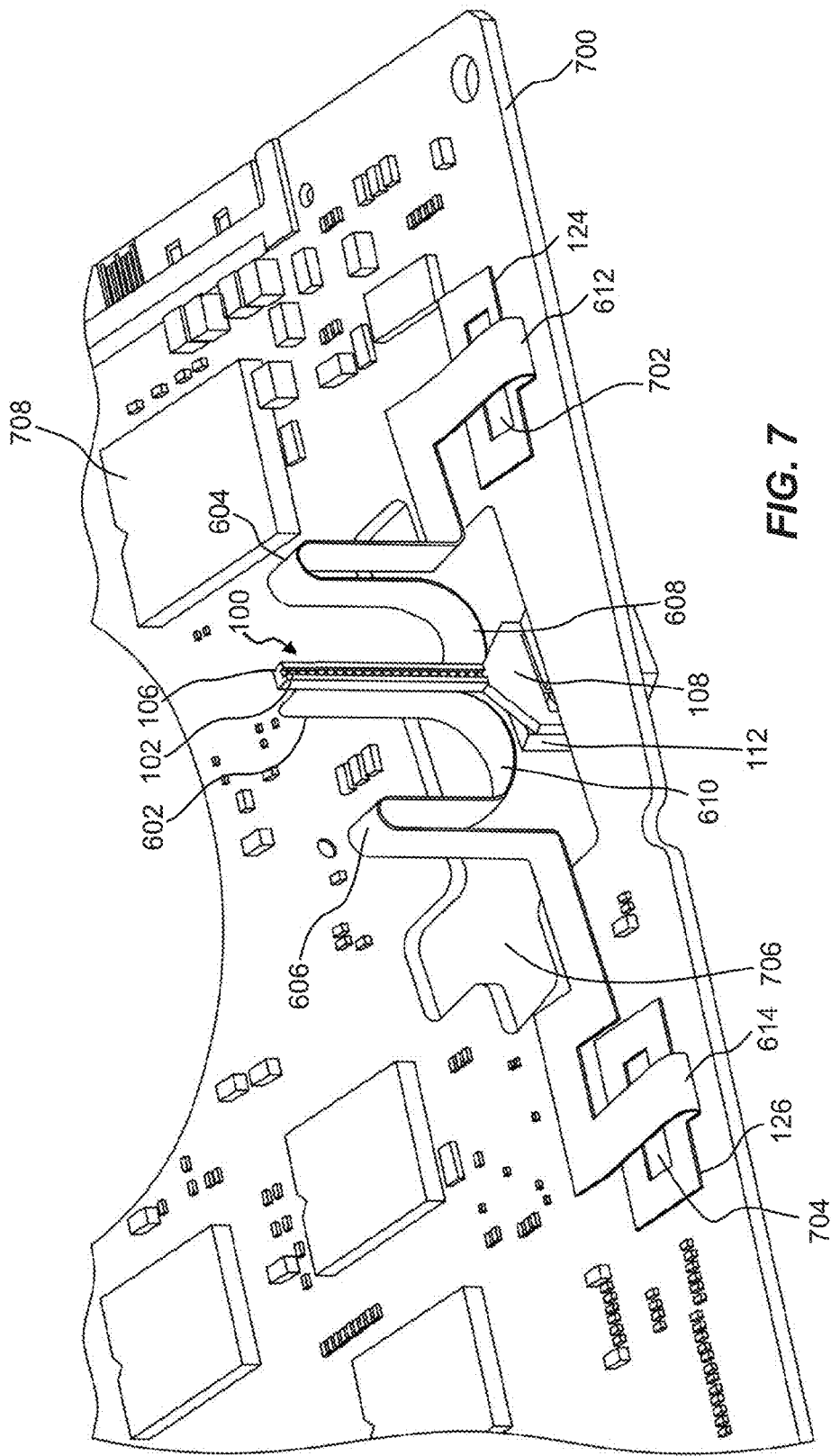
FIG. 7 is a partial perspective view of a monolithic tape head module on a circuit board, in accordance with an embodiment of the present invention.

FIG. 7 is a perspective view of the monolithic tape head module 100 on a circuit board 700, in accordance with an embodiment of the present invention. Circuit board 700 includes various circuitry components, such as component 708. Circuit board 700 further includes a cut-out 706 to accommodate monolithic tape head module 100. Circuit board connector portions 124/126 of the flex circuit connect to circuit board 700 at bonding or connection sites 702 and 704.

FIG. 8 is a functional block diagram illustrating a tape recording appliance, in accordance with an embodiment of the present invention. In an exemplary embodiment, tape appliance 800 includes monolithic tape head module 100. Tape appliance 800 may include several components providing a control and data transfer system for reading and writing data from a host CPU 802, an embodiment of which is described below in relation to FIG. 9, to a magnetic tape medium. Tape appliance 800 may include a channel adapter 804, a computer, such as microprocessor controller 806, a data buffer 808, a read/write data flow circuit 812, a motion control system 810, and a tape interface system 814 that includes a motor driver circuit 816 and read/write head unit 818.

Microprocessor controller 806 may provide overall control functionality for the operations of all other components of tape appliance 800. The functions performed by microprocessor controller 806 may be programmable via microcode routines (not shown) according to desired tape drive operational characteristics. During data write operations (with all dataflow being reversed for data read operations), microprocessor controller 806 activates channel adapter 804 to perform the required host interface protocol for receiving an information data block. Channel adapter 804 communicates the data block to the data buffer 808 that stores the data for subsequent read/write processing. Data buffer 808 in turn communicates the data block received from channel adapter 804 to read/write dataflow circuitry 812, which formats the device data into physically formatted data that may be recorded on a magnetic tape medium. Read/write dataflow circuitry 812 is responsible for executing all read/write data transfer operations under the control of microprocessor controller 806. Formatted physical data from read/write circuitry 812 is communicated to tape interface system 814. The latter includes one or more read/write modules, for example, modules that include read and write heads 400/402/404, in read/write head unit 818, and drive motor components (not shown) for performing forward and reverse movement of a tape medium 820 mounted on a supply reel 822 and a take-up reel 824. The drive components of tape interface system 814 are controlled by motion control system 810 and motor driver circuit 816 to execute such tape movements as forward and reverse recording and playback, rewind and other tape motion functions. In addition, in multi-track tape drive systems, motion control system 810 transversely positions read/write heads in read/write head unit 818 relative to the direction of longitudinal tape movement in order to record data in a plurality of tracks. Tape interface system 814 may include, for example, circuit board 700, and the components thereon, as illustrated in FIG. 7.

In various embodiments, during read operations, microprocessor controller 806 may receive the unformatted electrical signals from tape interface system 814, either directly or via read/write dataflow circuitry 812. In other embodiments, read/write dataflow circuitry 812 may perform various pre-processing functions on the electrical signals from tape interface system 814, and transmit information that is representative of the electrical signals to microprocessor controller 806. In these embodiments, microprocessor controller 806 may include appropriate electrical circuitry, logic, firmware, software, etc., to perform analysis of the electrical signals or information to determine various characteristics of the signals related to quality of the recorded data and the magnetic medium, in accordance with embodiments of the invention. In general, the appropriate electrical circuitry, logic, firmware, software, etc., to perform analysis of the electrical signals to determine various characteristics of the signals related to quality of the recorded data and the magnetic medium may be located in one or more functional components of a tape appliance, such as tape appliance 800, and/or in a host computer, such as host CPU 802.

Figure 9:
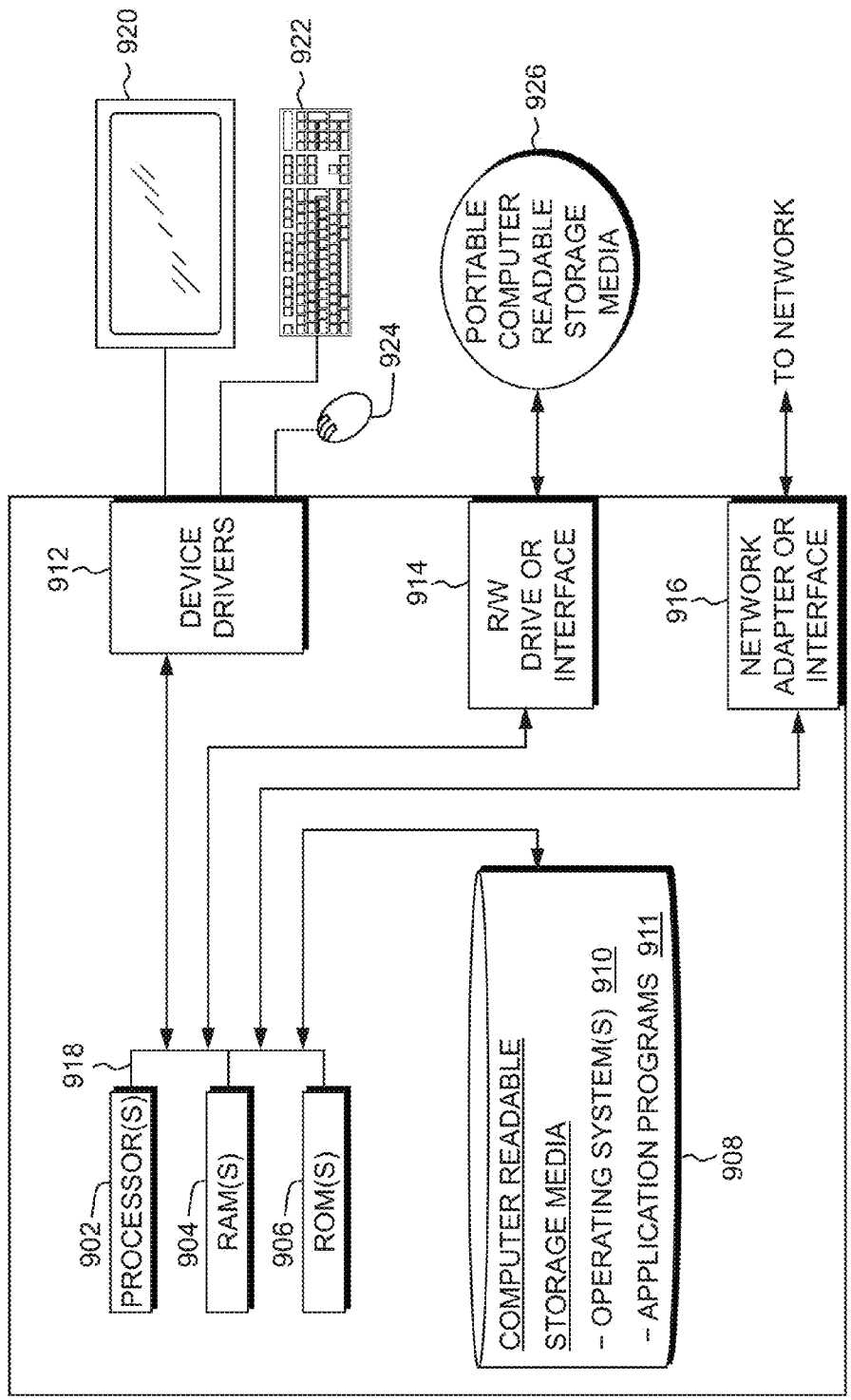
FIG. 9 depicts a block diagram of components of computing device of FIG. 8, in accordance with an embodiment of the present invention.

FIG. 9 depicts a block diagram of components of host CPU 802, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Host CPU 802 can include one or more processors 902, one or more computer-readable RAMs 904, one or more computer-readable ROMs 906, one or more computer-readable storage media 908, device drivers 912, read/write drive or interface 914, network adapter or interface 916, all interconnected over a communications fabric 918. Communications fabric 918 can be implemented with any architecture designed for passing data and/or control information between processors (such as microprocessors, communications and network processors, etc.), system memory, peripheral devices, and any other hardware components within a system.

One or more operating systems 910 and application program(s) 911 are stored on one or more of the computer-readable storage media 908 for execution by one or more of the processors 902 via one or more of the respective RAMs 904 (which typically include cache memory). In the illustrated embodiment, each of the computer-readable storage media 908 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host CPU 802 can also include a R/W drive or interface 914 to read from and write to one or more portable computer-readable storage media 926. Application program(s) 911 on host CPU 602 can be stored on one or more of the portable computer-readable storage media 926, read via the respective R/W drive or interface 914 and loaded into the respective computer-readable storage media 908.

Host CPU 802 can also include a network adapter or interface 916, such as a TCP/IP adapter card or wireless communication adapter (such as a 4G wireless communication adapter using OFDMA technology). Application program(s) on host CPU 602 can be downloaded to the computing device from an external computer or external storage device via a network (for example, the Internet, a local area network or other, wide area network or wireless network) and network adapter or interface 916. From the network adapter or interface 916, the programs are loaded into the computer-readable storage media 908. The network may comprise copper wires, optical fibers, wireless transmission, routers, firewalls, switches, gateway computers and/or edge servers.

Host CPU 802 can also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 can comprise hardware and software (stored in computer-readable tangible storage device 908 and/or ROM 906).

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. An apparatus, comprising:
an actuator rail;
a tape head transducer array coupled to the actuator rail and including a plurality of tape head transducer elements;
a flex circuit electrically coupled to the tape head transducer array, wherein the flex circuit includes a first plurality of electrical conductors in a first flex circuit path that are coupled to a portion of the plurality of tape head transducer elements, and a second plurality of electrical conductors in a second flex circuit path that are coupled to the remainder of the plurality of tape head transducer elements;
an actuator shaft connected to the actuator rail and coupled to a motor that is operated to move the actuator shaft; and
an upper flexure and a lower flexure mechanically coupled to the actuator rail and operated to restrict movement of the actuator rail to a direction aligned with the longitudinal axis of the actuator rail, wherein the upper flexure and the lower flexure are a cantilever spring that form a parallelogram with the actuator rail.

2. The apparatus of claim 1, wherein the tape head transducer array operates as a read transducer array.

3. The apparatus of claim 1, wherein the tape head transducer array operates as a write transducer array.

4. The apparatus of claim 1, wherein the transducer array includes the tape head transducer elements fabricated on a dielectric substrate, and the dielectric substrate is mounted onto a face of the actuator rail.

5. The apparatus of claim 1, wherein the transducer array includes the tape head transducer elements fabricated on a substrate, and the substrate acts as the actuator rail.

6. The apparatus of claim 1, wherein the tape head transducer further comprises a wire bond site that includes at least two wire bond pads per tape head transducer element, wherein the first and second plurality of electrical conductors in the first and second flex circuit paths electrically couple to the wire bond pads, and wherein the wire bond pads are arranged on the wire bond site in one of one row wire bond pads, or a plurality of rows of wire bond pads.

7. The apparatus of claim 1, wherein the motor is in a voice coil linear motor pancake configuration.

8. The apparatus of claim 7, wherein the voice coil linear motor is oriented such that the axis of the motor is orthogonal to the axis of the actuator rail, within a threshold value, and the plane of the motor is parallel to the face of the transducer array, within a threshold value.

9. The apparatus of claim 7, wherein the voice coil linear motor is oriented such that the axis of the motor is orthogonal to the axis of the actuator rail, within a threshold value, and the plane of the motor is orthogonal to the face of the transducer array, within a threshold value.

10. The apparatus of claim 1, wherein axis of movement of the transducer array is in the plane of the driving force of the motor, within a threshold value.

11. A tape appliance, comprising:
a plurality of tape head actuators, wherein at least one of the actuators includes:
an actuator rail;
a tape head transducer array coupled to the actuator rail and including a plurality of tape head transducer elements;
a flex circuit electrically coupled to the tape head transducer array, wherein the flex circuit includes a first plurality of electrical conductors in a first flex circuit path that are coupled to a portion of the plurality of tape head transducer elements, and a second plurality of electrical conductors in a second flex circuit path that are coupled to the remainder of the plurality of tape head transducer elements;
an actuator shaft connected to the actuator rail and coupled to a motor that is operated to move the actuator shaft; and
an upper and a lower flexure mechanically coupled to the actuator rail and operated to restrict movement of the actuator rail to a direction aligned with the longitudinal axis of the actuator rail, wherein the upper flexure and the lower flexure are a cantilever spring that form a parallelogram with the actuator rail.

12. The tape appliance of claim 11, wherein the tape head transducer array operates as a read transducer array.

13. The tape appliance of claim 11, wherein the tape head transducer array operates as a write transducer array.

14. The tape appliance of claim 11, wherein the transducer array includes the tape head transducer elements fabricated on a dielectric substrate, and the dielectric substrate is mounted onto a face of the actuator rail.

15. The tape appliance of claim 11, wherein the transducer array includes the tape head transducer elements fabricated on a substrate, and the substrate acts as the actuator rail.

16. The tape appliance of claim 11, wherein the tape head transducer further comprises a wire bond site that includes at least two wire bond pads per tape head transducer element, wherein the first and second plurality of electrical conductors in the first and second flex circuit paths electrically couple to the wire bond pads, and wherein the wire bond pads are arranged on the wire bond site in one of one row wire bond pads, or a plurality of rows of wire bond pads.

17. The tape appliance of claim 11, wherein the motor is in a voice coil linear motor pancake configuration.

18. The tape appliance of claim 17, wherein the voice coil linear motor is oriented such that the axis of the motor is orthogonal to the axis of the actuator rail, within a threshold value, and the plane of the motor is parallel to the face of the transducer array, within a threshold value.

19. The tape appliance of claim 17, wherein the voice coil linear motor is oriented such that the axis of the motor is orthogonal to the axis of the actuator rail, within a threshold value, and the plane of the motor is orthogonal to the face of the transducer array, within a threshold value.

20. The tape appliance of claim 11, wherein axis of movement of the transducer array is in the plane of the driving force of the motor, within a threshold value.

* * * * *